Figure 1:
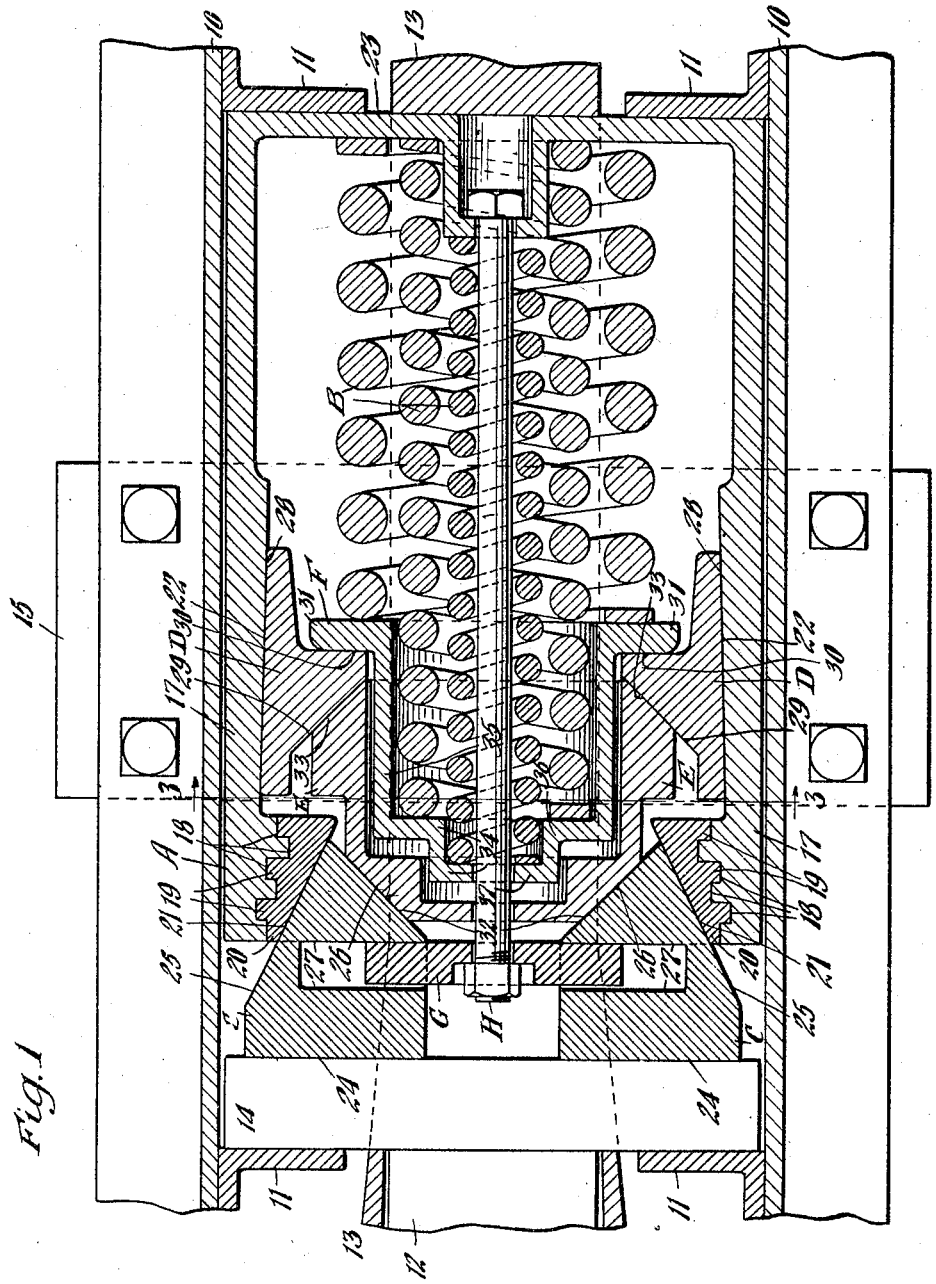

May 25, 1926.

J. F. O'CONNOR 1,585,677

FRICTION SHOCK ABSORBING MECHANISM

Filed July 5, 1923    2 Sheets-Sheet 1

Witnesses
Wm. Geiger

Inventor
John F. O'Connor
By George J. Haight
His Atty.

May 25, 1926.  
J. F. O'CONNOR  
1,585,677  
FRICTION SHOCK ABSORBING MECHANISM  
Filed July 5, 1923    2 Sheets-Sheet 2
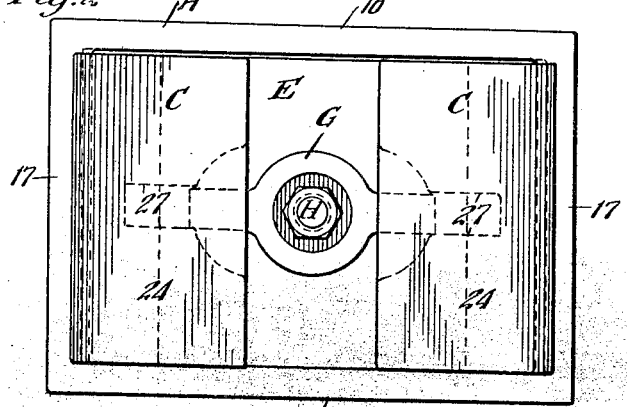
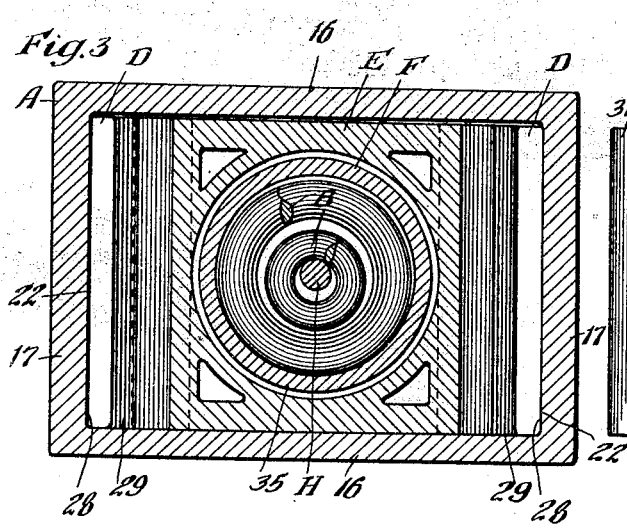
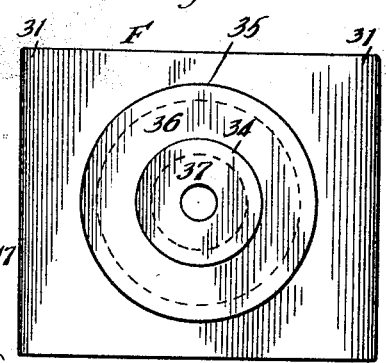
Witnesses  
Wm. Geiger
Inventor  
John F. O'Connor  
By George J. Haight  
His Atty.

Patented May 25, 1926.

1,585,677

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 5, 1923. Serial No. 649,424.

This invention relates to improvements in friction shock absorbing mechanisms.

One object of the invention is to provide a friction shock absorbing mechanism, especially adapted for railway draft riggings, wherein are obtained high capacity and certain release.

A more specific object of the invention is to provide a mechanism of the character indicated wherein is obtained a high differential action with greatly augmented spring travel as compared with the draw-bar or coupler travel.

The invention furthermore consists in the improvements, parts and devices, and in the novel combinations of the parts and devices herein shown, described and made the subject of the claims.

In the drawings forming a part of this specification, Figure 1 is a horizontal longitudinal sectional view of a portion of a railway draft rigging showing my improvements in connection therewith. Figure 2 is a front end elevational view of the shock absorbing mechanism illustrated in Figure 1. Figure 3 is a vertical transverse sectional view of the shock absorbing mechanism proper and corresponding to the line 3—3 of Figure 1. Figure 4 is a front end elevational view of the spring follower employed in my construction.

In the said drawings, 10—10 denote the usual draft sills of a car underframe to the inner faces of which are secured front and rear stop lugs 11—11 of the usual construction. A portion of a draw-bar is indicated at 12, the same being operatively associated with the shock absorbing mechanism by a hooded cast yoke 13 and in which is disposed said mechanism and a front follower 14. The yoke and parts therewithin are supported in operative position by a detachable saddle plate 15.

The improved shock absorbing mechanism comprises, broadly, a combined friction shell and spring cage casting A; a spring resistance B; a front outer set of pressure transmitting wedge friction shoes C—C; an inner set of wedge friction shoes D—D; a pressure transmitting wedge element E; a spring follower F; a lock washer G; and a retainer bolt H.

The casting A is of rectangular cross section having top and bottom walls 16—16 and side walls 17—17. The inner faces of the side walls 17, at their outer ends, are provided with a series of grooves or notches 18 to receive co-operating projections 19 formed on the wear resisting blocks 20, the latter having inner flat friction surfaces 21 which are converged inwardly of the shell at a comparatively steep angle. Inwardly of the converged friction surfaces 21, the inner faces of the side walls 17 are provided with additional integral longitudinally extending friction surfaces 22 of greater extent, said surfaces 22 being also converged inwardly of the shell but at a comparatively small angle. The inner end of the casting A has an integral transverse wall 23 which co-operates with the rear stop lugs 11 as the rear follower of the mechanism.

The two front or outer wedge friction shoes C are of like construction and each is in the form of a cast block having a front transverse bearing face 24, an outer friction wedge face 25 co-operable with the corresponding shell friction surface 21, and an inner wedge face 26 inclined rearwardly and away from the axis of the mechanism. Each of the members C is transversely recessed, as indicated at 27, to loosely accommodate the lock washer G which extends transversely of the mechanism and by which the overall length of the parts is maintained through the retainer bolt H, which is anchored at its front end to said lock washer G and at its rear end to a suitable hollow boss formed integral with the casting A.

The two inner friction shoes D are of like construction, each having an outer flat friction surface 28 co-operable with the corresponding shell friction surface 22, an inner wedge face 29, the latter being converged inwardly of the shell, and a transverse shoulder 30 against which the laterally extended flange 31 of the spring follower F abuts to thereby afford a yielding resistance for the shoes D.

The intermediate pressure transmitting member E is in the form of a hollow casting and is provided at its front end with wedge faces 32—32 corresponding in inclination to and co-operating with the wedge faces 26 of the members C. At its inner end, the member E is provided with additional oppositely extending wedge faces 33 co-operable with the corresponding wedge faces 29 of the shoes D. Said member E is suitably recessed to loosely receive therewithin the double cup sections 34 and 35 of the spring follower F. The latter is so formed that the outer heavy coil of the spring resistance bears on the flange 31, the intermediate coil bears on the transverse section 36 of the follower and the central coil bears on the front transverse section 37 of the spring follower.

In actual practice, the wedge faces 21 and 25 will make a lesser angle with the axis of the mechanism than the wedge faces 33 and 29.

The operation of the mechanism is as follows, assuming a buff action of the draw-bar. As the draw-bar 12 and follower 14 move inwardly or toward the right, as viewed in Figure 1, the wedge friction shoes C will be moved longitudinally simultaneously therewith. As said shoes C travel down the inclined friction surfaces 21 of the shell, they are caused to approach each other laterally, thus imparting a more rapid longitudinal movement to the intermediate pressure transmitting member E. The latter, in turn, transfers the pressure to the friction shoes D, which are caused to travel longitudinally in unison with the member E, and, in addition, the shoes D will be given an augmented longitudinal travel due to their movement along the converging shell friction surfaces 22. In this manner, it will be observed that the shoes D are given a very much greater and faster travel than that of the draw-bar. As will be understood by those skilled in the art, the spring resistance is transmitted to the shoes D, and, in release, the parts will be restored by the reaction of the spring resistance, it being evident that the members C will freely disengage from or collapse with respect to the shell friction surfaces 21 and that danger of the member E sticking with respect to the shoes D is minimized on account of the blunt angle of the wedge faces 29 and 33. Summarizing the invention, it will be observed that I have provided the friction shell with two sets of opposed friction surfaces, the sets being arranged in tandem formation and both converged inwardly of the shell, one at a greater angle than the other. Two sets of tandem arranged co-operating wedge friction shoes are also employed with an intermediate member between the sets of shoes for transmitting the pressure of the front set to the inner set.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior tandem arranged sets of opposed friction surfaces, the surfaces of one set being converged inwardly of the shell; of outer friction elements co-operable with the outer set of friction surfaces; friction shoes co-operable with the inner set of friction surfaces; a hollow wedge pressure transmitting block interposed between said elements and shoes; a spring resistance; and a spring follower interposed between said resistance and said shoes, said follower having a cup-shaped extension extending within the hollow portion of said block.

2. In a friction shock absorbing mechanism, the combination with a friction shell closed at one end by a wall and having at its other end, opposed friction surfaces converged inwardly of the shell at one angle and provided inwardly of said surfaces with an additional set of friction surfaces converged in the same direction but at a lesser angle; of a pair of wedge pressure transmitting friction elements co-operable with said first named set of shell friction surfaces; an inner set of wedge friction shoes co-operable with the second named set of shell friction surfaces; a pressure transmitting block having wedge faces at each end co-operable with said elements and shoes to transmit pressure from the one set to the other; a spring follower cooperating with the shoes; and a spring resistance comprising a plurality of elements having their opposite ends bearing respectively on the end wall of the shell and spring follower, certain of the elements of said spring resistance being of greater length than the remaining elements and bearing on said spring follower outwardly of said inner set of friction shoes.

3. In a friction shock absorbing mechanism, the combination with a friction shell having, a transverse wall at one end and at its other end, opposed friction surfaces converged inwardly of the shell at one angle and provided inwardly of said surfaces with an additional set of friction surfaces converged in the same direction but at a lesser angle; of a pair of wedge pressure transmitting friction elements co-operable with said first named set of shell friction surfaces; an inner set of wedge friction shoes co-operable with the second named set of shell friction surfaces; a pressure transmitting block having wedge faces at each end co-operable with said elements and shoes to transmit pressure from the one set to the other; a follower co-operating with the shoes; and a main spring resistance having its opposite ends bearing on said follower and transverse end wall respectively, said spring resistance including elements extending outwardly beyond said inner set of wedge friction shoes.

In witness that I claim the foregoing I have hereunto subscribed my name this 30th day of June 1923.

JOHN F. O'CONNOR.